United States Patent
Suri

(10) Patent No.: US 8,284,905 B1
(45) Date of Patent: Oct. 9, 2012

(54) METHOD AND APPARATUS FOR MONITORING CONVERSATIONS TO CONTROL TELECOMMUNICATIONS

(75) Inventor: Sourabh Suri, Pune (IN)

(73) Assignee: Symantec Corporation, Mountain View, CA (US)

( * ) Notice: Subject to any disclaimer, the term of this patent is extended or adjusted under 35 U.S.C. 154(b) by 1136 days.

(21) Appl. No.: 12/164,316

(22) Filed: Jun. 30, 2008

(51) Int. Cl.
*H04M 1/04* (2006.01)
*H04M 3/08* (2006.01)
*H04M 3/22* (2006.01)

(52) U.S. Cl. ............... 379/32.01; 379/265.07; 704/251; 704/252; 704/255; 726/26

(58) Field of Classification Search ........... 379/7, 32.01, 379/32.04, 35, 188, 189, 191, 201.01, 265.07, 379/88.02, 88.19, 265.06; 704/251, 252, 704/255; 726/22, 25, 26, 35
See application file for complete search history.

(56) References Cited

U.S. PATENT DOCUMENTS

| | | | |
|---|---|---|---|
| 6,600,821 B1 * | 7/2003 | Chan et al. | 379/265.07 |
| 7,437,290 B2 * | 10/2008 | Danieli | 704/251 |
| 7,860,222 B1 * | 12/2010 | Sidler et al. | 379/32.01 |
| 8,127,360 B1 * | 2/2012 | Wilhelm et al. | 726/25 |
| 2004/0161086 A1 * | 8/2004 | Buntin et al. | 379/189 |
| 2005/0027723 A1 * | 2/2005 | Jones et al. | 707/100 |
| 2007/0041545 A1 * | 2/2007 | Gainsboro | 379/188 |
| 2008/0221882 A1 * | 9/2008 | Bundock et al. | 704/235 |

* cited by examiner

*Primary Examiner* — Binh Tieu
(74) *Attorney, Agent, or Firm* — Wilmer Cutler Pickering Hale & Dorr LLP

(57) ABSTRACT

A method and apparatus for monitoring conversations to control telecommunications is provided. In one embodiment, a method for identifying undesirable data within voice communications to control telecommunications, comprising processing voice communications between at least two entities and analyzing the voice communications to determine indicia of undesirable data.

18 Claims, 3 Drawing Sheets

METHOD AND APPARATUS FOR MONITORING CONVERSATIONS TO CONTROL TELECOMMUNICATIONS

BACKGROUND

1. Field of the Invention

Embodiments of the present invention generally relate to telecommunication conversation control and, more particularly, to a method and apparatus for monitoring conversations to control telecommunications.

2. Description of the Related Art

In modern world, telecommunication is the most widely used mode of communication between entities (e.g., persons). But, the entities may also misuse a telephone (e.g., mobile phones, IP phones, and the like) to make prank calls, data leakage, obscene talks, criminal activities and/or the like. Furthermore, a disgruntled employee of an organization may leak or disclose sensitive data in order to harm the organization. As a result, telecommunication management is a significant issue (such as but not limited to security and call quality for customer care/technical support) that affects many organizations.

Current data leakage protection techniques prevent or identify disclosure of sensitive data through emails or instant messages. However, the data leakage protection technique does not work for telephones, such as mobile phones, Personal Digital Assistant (PDA), IP phone, landline phone and the like. The disgruntled employee may recite the sensitive data to a listener instead of emailing such sensitive data. As a result, the organization is unable to prevent the sensitive data leakage. Further, the organization is not able to identify the cause of such sensitive data leakage. Furthermore, it is very difficult to monitor every call that is been made from the organization premises. If all calls are monitored manually then it would become significantly expensive activity.

Accordingly, there is a need in the art for a method and apparatus for monitoring conversations to identify undesirable data in order to control telecommunications associated with an organization.

SUMMARY OF THE INVENTION

Embodiments of the present invention comprise a method and apparatus for monitoring conversations to control telecommunications. In one embodiment, a method for identifying undesirable data within voice communications to control telecommunications, comprising processing voice communications between at least two entities and analyzing the voice communications to determine indicia of undesirable data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
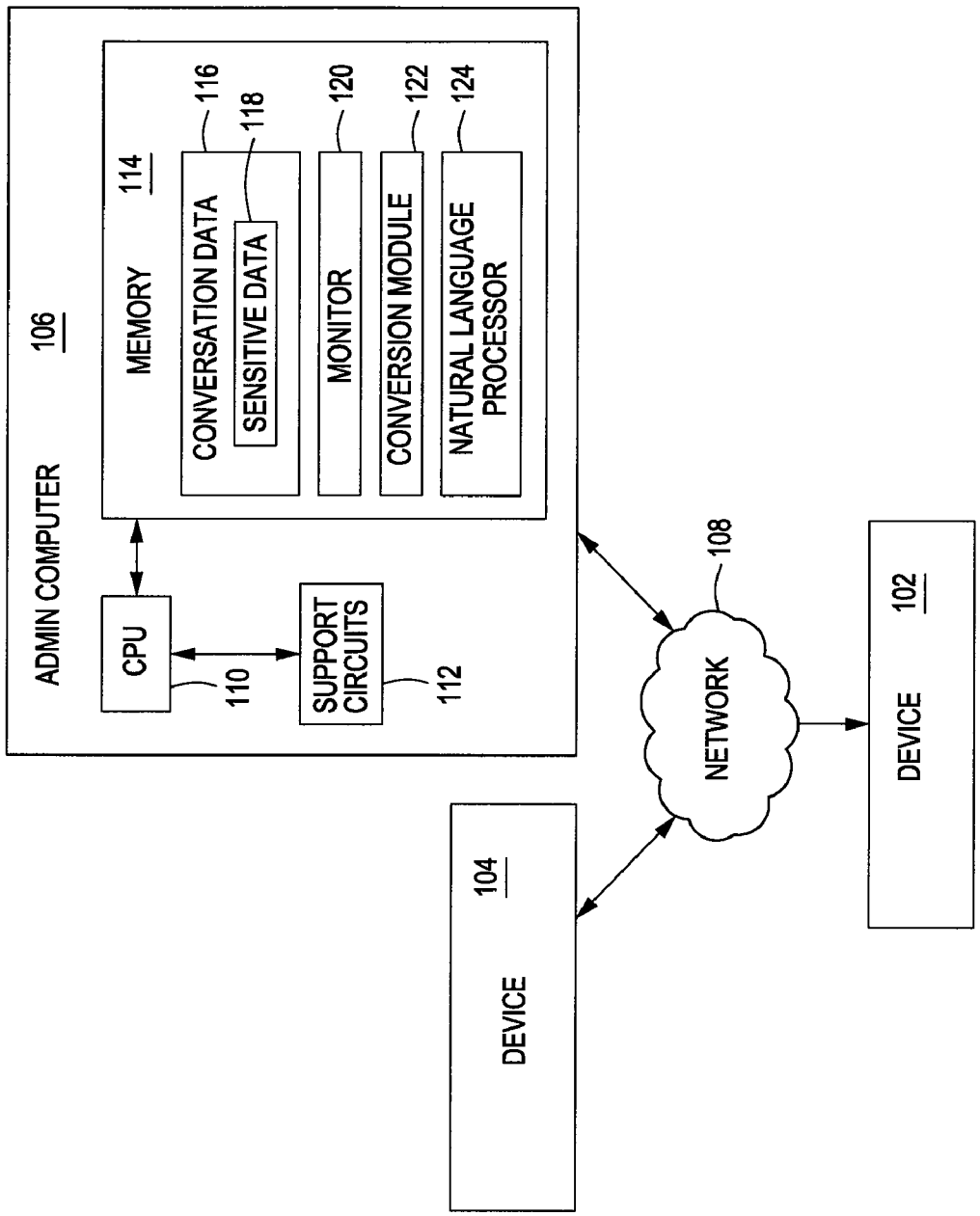
FIG. 1 is a block diagram of a system for identifying undesirable data to further process telecommunications associated with an organization, in accordance with one or more embodiments of the present invention.

FIG. 1 is a block diagram of a system 100 for identifying undesirable data to further process telecommunications according to an embodiment of the present invention. The system 100 comprises an administrator computer 106, a first device 102 and a second device 104, coupled to each other through a network 108.

The device 102 is a communication device (e.g., a voice communication device, such as a mobile phone, a Voice over Internet Protocol (VOIP) phone, a landline phone and/or the like). The device 104 is similar to the device 102 and may also be a communication device. In one embodiment, the device 102 and the device 104 exchange voice communications between two or more entities (e.g., people). Either the device 102 or the device 104 may be inside the organization control. For example, the device 102 may be used by an entity (e.g., an employee of a company) to engage in an undesirable conversation with another entity (e.g., an industrial spy, another employee and/or the like) using the device 104.

The administrator computer 106 is a computing device (e.g., laptop, desktop, Personal Digital Assistant (PDA)), such as those generally known in the art. The administrator computer 106 includes a Central Processing Unit (CPU) 110, support circuits 112, and a memory 114. The CPU 110 may comprise one or more commercially available microprocessors or microcontrollers that facilitate data processing and storage. The various support circuits 112 facilitate the operation of the CPU 110 and comprise at least one of clock circuits, power supplies, cache, input/output circuits, and the like. The memory 114 comprises at least one of Read Only Memory (ROM), Random Access Memory (RAM), disk drive storage, optical storage, removable storage, and the like. The memory 114 further includes various data, such as conversation data 116. The memory 114 includes various software packages, such as a monitor 120, a conversation analyzer 124 and a conversion module 122.

The administrator computer 106 may be a pass-through device through which the voice communications would pass if the voice communications are not marked as undesirable data. In such a case, the device 102 and the device 104 may not have a direct connection and may be connected through the administrator computer 106. Alternatively, the administrator computer 106 may be a listening device, which monitors the voice communications between the device 102 and the device 104. if the voice communications include undesirable data, the administrator may be prompted to take one or more suggested actions. In such a case, the device 102 and the device 104 may be connected to each other directly and the administrator computer 106 may also be connected to the same line.

The network 108 comprises a communication system that connects a computer system by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

According to various embodiments of the present invention, the monitor 120 is configured to process voice communications between two or more entities (e.g., persons). In one embodiment, the monitor 120 records the voice communications between the two or more entities as the conversation data 116. In another embodiment, the conversation analyzer 122 examines indicia of undesirable data to prevent (e.g., mute) subsequent and/or future communication between the two or more entities.

According to an embodiment, the conversion module 122 converts the voice communications into a particular format, such as but not limited to a textual format, binary format and/or the like and stores the converted voice communications as the conversation data 116. According to various embodiments of the present invention, the conversation data 116 includes converted voice communications between two or more entities. The conversation data 116 may be an undesirable conversation based on indicia of undesirable data 118 within the voice communications. For example, the conversation data 116 may include the undesirable data 118. According to various embodiments of the present invention, the undesirable data 118 may be a confidential organization data, any obscene language data, any kind of data intended to harass and the like.

According to various embodiments of the present invention, the conversation analyzer 124 (such as but not restricted to a natural language processor) analyzes the voice communications between the two or more entities. In one embodiment, the conversation analyzer 124 categorizes the voice communications into one or more categories (e.g., a casual conversation, an undesirable conversation, a technical conversation, and/or the like).

In one embodiment, the communication analyzer 124 categorizes the voice communications as an undesirable conversation (e.g., sensitive data leakage, obscene language, harassment language, and/or the like) based on the indicia of the undesirable data 118. In another embodiment, the communication analyzer 124 examines (e.g., searches) the conversation data 116 to identify indicia of sensitive data leakage (e.g., unauthorized disclosure of sensitive data, such as credit card numbers, social security numbers and/or the like). As described further below, the conversation analyzer 124 may identify one or more emotional attributes of sensitive data leakage, such a nervous speech, anxiousness, whispering and/or the like.

In one embodiment, the conversation analyzer 124 identifies one or more emotional attributes associated with the voice communications between the entities. In another embodiment, the conversation analyzer 124 determines that the one or more emotional attributes are associated with an undesirable conversation (e.g., sensitive data leakage, obscene language, harassment, and/or the like). Such emotional attributes manifest in the words and speech of the entities. In one embodiment, the conversation analyzer 124 identifies one or more patterns that indicate such emotional attributes associated with the voice communications (e.g., the conversation data 116). In a yet another embodiment of the present invention, the conversation analyzer 124 analyzes words, sound and modulation of the voice communications to determine the one or more emotional attributes. For example, an employee disclosing customer social security numbers may exhibit various emotions normally associated with criminal or fraudulent activity, such as anxiousness, nervousness and excitement.

As an example and not as a limitation, two or more entities (at least one of which is inside the organization) may utilize a device, such as the device 102, the device 104 (e.g., mobile phone, IP phone, landline phone and the like) to initiate voice communications between each other that is undesirable to the organization. In one embodiment, the monitor 120 records the voice communications between the two or more entities. The conversation analyzer 124 categorizes the voice communications into one or more categories. In one embodiment, the conversion module 122 converts the voice communications into the conversation data 116. In one embodiment, the conversation analyzer 124 examines (e.g., searches) the conversation data (e.g., the conversation data 116) to identify the undesirable data 118. In one embodiment, the conversation analyzer 124 compares various portions of the conversation data 116 to the sensitive data to determine indicia of data leakage associated with the voice communications.

In another embodiment, the conversation analyzer 124 analyzes the voice communicates to detect a pattern that indicates an undesirable conversation. The pattern may be a linguistic pattern, a grammatical pattern and/or a portion of the undesirable data 118. In one embodiment, the conversation analyzer 124 may implement a machine learning technique to identify the patterns based on a training data that includes one or more undesirable conversations as well as one or more benign conversations. The conversation analyzer 124 identifies the pattern in the conversation data 116. The conversation analyzer 124 may use a lexical chain to determine a context of the voice communications.

In yet another embodiment, the conversation analyzer 124 identifies various indicia of the undesirable data 118. If the various indicia identified by the conversation analyzer 124 indicate the undesirable conversation, such as leakage of the sensitive data (e.g., the undesirable data 118), obscene language, harassment language and/or the like, then the monitor 120 notifies an administrator of a potential sensitive data leakage taking place or will take place. Alternatively, in one embodiment, the monitor 120 will prevent (e.g., mute) the subsequent voice communications between the two or more entities. The monitor 120 may prevent the subsequent voice communications by configuring various channels, such as an Electronic Private Automatic Branch eXchange (EPABX), a base station of a mobile phone, a server (e.g., the administrator computer 106 of FIG. 1) through which the voice communications is routed using a Voice Over Internet Protocol (VOIP) and the like.

Figure 2:
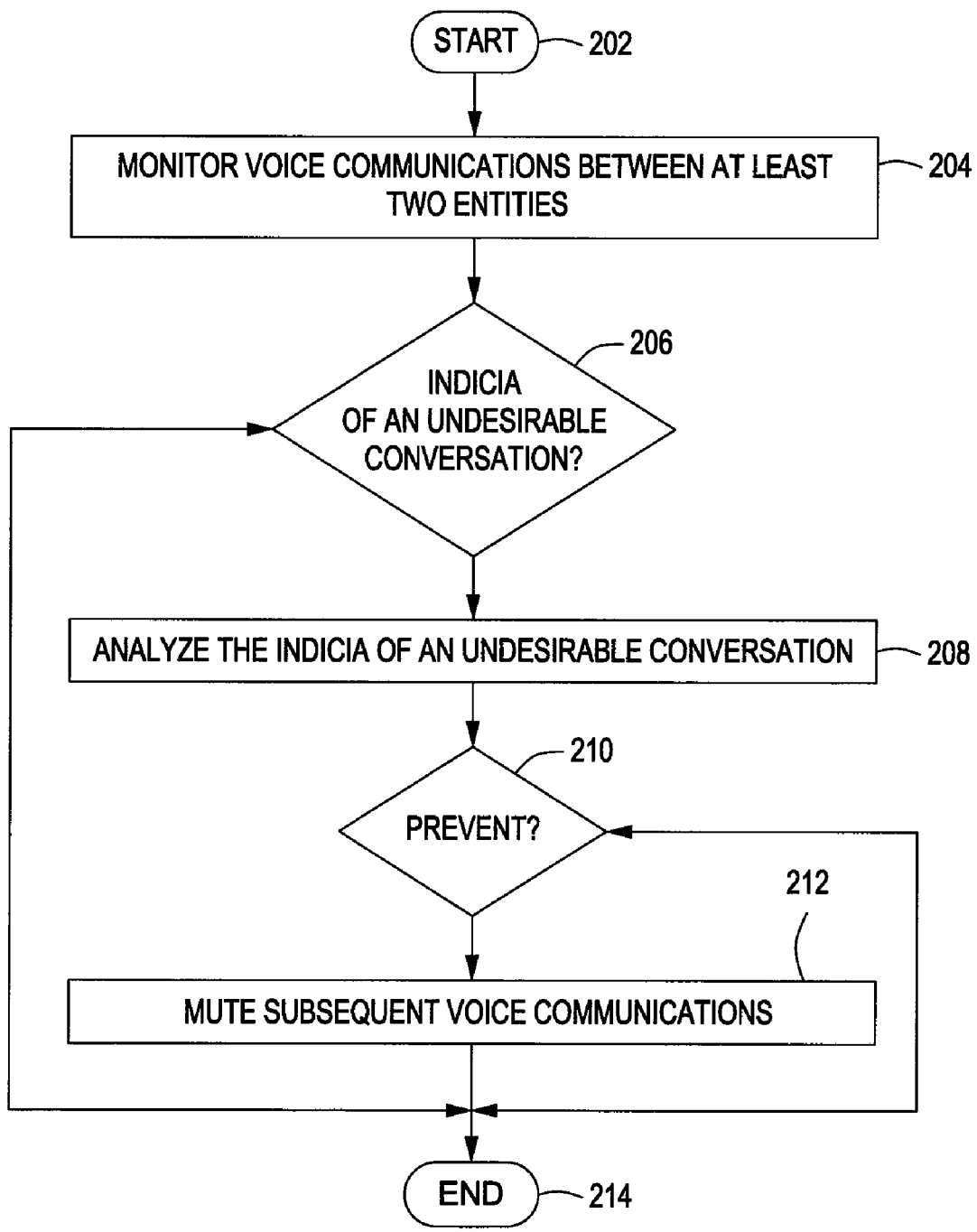
FIG. 2 is a flow diagram of a method for identifying undesirable data to further process telecommunications associated with an organization, in accordance with one or more embodiments of the present invention.

FIG. 2 is a flow diagram of a method 200 for identifying undesirable data to further process telecommunications associated with an organization according to one or more embodiments of the present invention. The method 200 starts at step 202 and proceeds to step 204, at which voice communications between two or more entities (e.g., persons) is monitored.

At step 206, a determination is made as to whether the voice communications between the two or more entities include indicia of undesirable data. In one embodiment, a conversation analyzer (e.g., the conversation analyzer 124 of FIG. 1) determines the indicia of undesirable data. If, it is determined that there is no indicia of undesirable data (option "NO") then the method 200 proceeds to step 214 where the method 200 ends. If, at step 206 it is determined that there is indicia of an undesirable data (option "YES"), then the method 200 proceeds to step 208. At step 208, the indicia of the undesirable data is analyzed.

At step 210, a determination is made as to whether a subsequent and/or future voice communications is to be further processed. The determination is made based on the category of the voice communication. If, it is determined that the subsequent and/or future voice communications is not to be further processed (option "NO") then the method 200 proceeds to the step 214 where the method 200 ends. If, at step 210 it is determined that the subsequent voice communications is to be further processed (option "YES") then the method 200 proceeds to step 212. At step 212, the subsequent and/or future voice communications between the two or more entities are further processed (e.g. not limited to muting, recording and/or the like). As an example and not as a limitation, a monitor (e.g., the monitor 120 of FIG. 1) prevents the voice conversations by controlling various communication architecture, such as an Electronic Private Automatic Branch eXchange (EPABX), a base station of a mobile phone, a server (e.g., the administrator computer 106 of FIG. 1) through which the voice communications is routed using the Voice Over Internet Protocol (VOIP) and the like. At step 214, the method 200 ends.

Figure 3:
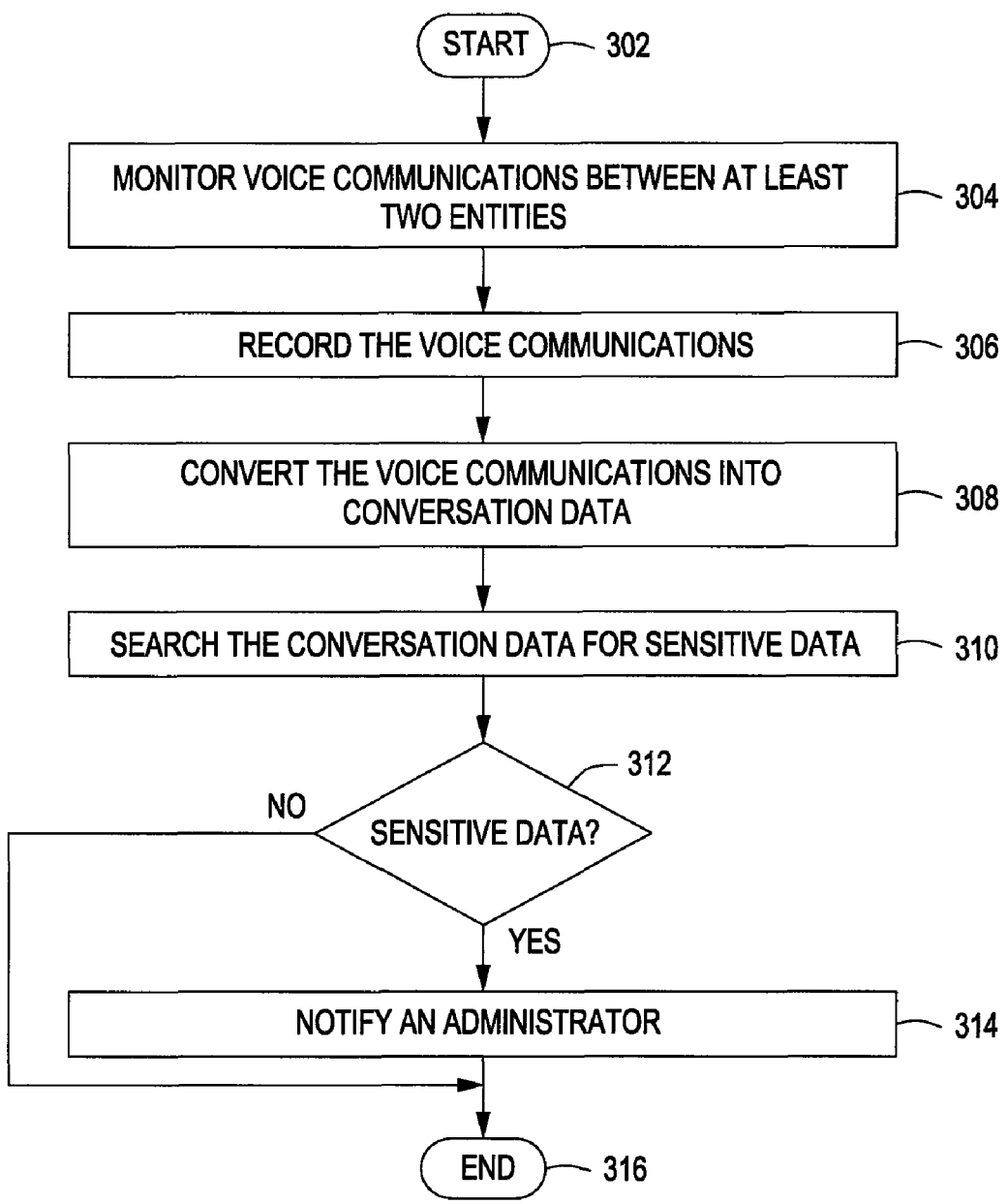
FIG. 3 is a flow diagram of a method for monitoring conversations to control telecommunications associated with an organization, in accordance with one or more embodiments of the present invention.

FIG. 3 is a flow diagram of a method 300 for monitoring conversations to control telecommunications according to one or more embodiments of the present invention. The method 300 starts at step 302 and proceeds to step 304, at which voice communications between two or more entities (e.g., persons) are captured.

At step 306, the captured voice communications are converted into conversation data (e.g., the conversation data 116 of FIG. 1). At step 308, the conversation data is examined to identify undesirable data (e.g., the undesirable data 118 of FIG. 1). At step 310, a determination is made as to whether the undesirable data is present in the conversation data If, it is determined that the undesirable data is not present in the conversation data (option "NO") then the method 300 proceeds to step 314 at which the method 300 ends. In one embodiment, the conversation analyzer (e.g., the conversation analyzer 124 of FIG. 1) identifies a pattern within the conversation data that indicates an undesirable conversation.

If at step 310, it is determined that the undesirable data is present in the conversation data (option "YES") then the method 300 proceeds to step 312. At step 314, the monitor may perform various actions such as but not limited to notifying an administrator (e.g., the administrator computer 106) about the undesirable data being passed or a blocked conversation. In one embodiment, the monitor (e.g., the monitor 120 of FIG. 1) communicates an alert/warning to the administrator for the potential undesirable data been leaked. At step 314, the method 300 ends.

Thus, various embodiments of the present invention have been provided. The embodiments of the invention may advantageously monitor telecommunication conversation. In one embodiment, the inventive apparatus advantageously prevents any potential data leakage through telephones, such as mobile phones. In another embodiment, the inventive method and apparatus may be utilized to prevent subsequent and/or future conversation between two or more entities (one of which is inside the organizations control). According to various embodiments of the present invention, the inventive methods and apparatus may advantageously be utilized to notify an administrator about the potential data leakage and recognizes the entities for such data leakages.

While the foregoing is directed to embodiments of the present invention, other and further embodiments of the invention may be devised without departing from the basic scope thereof, and the scope thereof is determined by the claims that follow.

The invention claimed is:

1. A method for identifying undesirable data within voice communications to control telecommunications, the method comprising:

processing voice communications between at least two entities;

analyzing the voice communications to determine one or more indicia of undesirable data, the indicia including one or more of leakage of sensitive data, obscene language, and language intended to harass, and determining an emotional attribute associated with sensitive data leakage during the voice communications when the indicia include leakage of sensitive data.

2. The method of claim 1, wherein analyzing the voice communications further comprises analyzing the indicia of an undesirable conversation to categorize the voice communications.

3. The method of claim 1 further comprising categorizing the voice communications as an undesirable conversation based on the indicia of the undesirable data.

4. The method of claim 3 further comprising preventing subsequent voice communications.

5. The method of claim 1, wherein processing the voice communications further comprising:

converting the voice communications into conversation data; and examining the conversation data to identify undesirable data.

6. An apparatus for identifying undesirable data within voice communications to control telecommunications, the apparatus comprising:

a monitor for processing voice communications between at least two entities; and a conversation analyzer for analyzing the voice communications to determine one or more indicia of undesirable data, the indicia including one or more of confidential data, obscene language, and data intended to harass, and for determining an emotional attribute associated with confidential data during the voice communications when the indicia include confidential data.

7. The method of claim 1 further comprising training a machine learning technique with the indicia of the undesirable data.

8. The apparatus of claim 7 further comprising a conversion module for converting the voice communications into conversation data.

9. The apparatus of claim 8, wherein the conversation analyzer examines the conversation data to identify the undesirable data.

10. The apparatus of claim 7, wherein the conversation analyzer examines the indicia of an undesirable data to categorize the voice communications.

11. The apparatus of claim 7, wherein the conversion analyzer categorizes the voice communications as an undesirable conversation based on the indicia of an undesirable data.

12. The apparatus of claim 11, wherein the monitor mutes subsequent voice communications.

13. A system for identifying undesirable data within voice communications to control telecommunications, the system comprising:

a first telecommunication device;

a second telecommunication device for exchange voice communications with the first telecommunication device; and an administrator computer comprising:

a monitor for processing voice communications between the first telecommunication device and the second telecommunication device, and a conversation analyzer for analyzing the voice communications to determine one or more indicia of undesirable data, the indicia including one or more of confidential data, obscene language, and data intended to harass, and for determining an emotional attribute associated with confidential data during the voice communications when the indicia include confidential data.

14. The system of claim 13 further comprising a conversion module for converting the voice communications into conversation data.

15. The system of claim 13, wherein the conversation analyzer examines the conversation data to identify the undesirable data.

16. The system of claim 13, wherein the monitor prevents subsequent voice communications associated with the indicia of the undesirable data.

17. The system of claim 13, wherein the conversion analyzer categorizes the voice communications as an undesirable conversation based on the indicia of an undesirable data.

18. The system of claim 13, wherein the monitor notifies a system administrator of the undesirable conversation between the first communication device and the second communication device.

* * * * *